United States Patent [19]
deZarauz

[11] 4,079,176
[45] Mar. 14, 1978

[54] POLYMERIZATION PROCESS
[75] Inventor: Yves deZarauz, Le Cendre, France
[73] Assignee: Compagnie Generale des Etablissements Michelin, Clermont-Ferrand, France
[21] Appl. No.: 697,273
[22] Filed: Jun. 17, 1976
[30] Foreign Application Priority Data
Jun. 24, 1975  France ............... 75 20007
[51] Int. Cl.$^2$ ............... C08F 4/48; C08F 4/50
[52] U.S. Cl. ............... 526/177; 526/176; 526/178
[58] Field of Search ............... 526/176, 177, 178
[56] References Cited
U.S. PATENT DOCUMENTS

| | | | |
|---|---|---|---|
| 3,380,979 | 4/1968 | Chiang | 526/187 |
| 3,429,861 | 2/1969 | Chiang et al. | 526/187 |
| 3,448,092 | 3/1969 | Chiang | 526/178 |
| 3,526,604 | 9/1970 | Wadsworth | 526/177 |
| 3,539,542 | 3/1968 | Nakatzuka et al. | 526/187 |
| 3,631,006 | 12/1971 | Hawkins | 526/177 |

FOREIGN PATENT DOCUMENTS

| | | | |
|---|---|---|---|
| 27662 | 11/1969 | Japan | 526/187 |

Primary Examiner—William F. Hamrock
Attorney, Agent, or Firm—Brumbaugh, Graves, Donohue & Raymond

[57] ABSTRACT

Process of homopolymerizing conjugated dienes or copolymerizing conjugated dienes either with each other or with vinyl aromatic compounds to form elastomeric products having simultaneously a high content of trans-1,4 linkages and a low content of 1,2 linkages.

In accordance with the invention, the monomers are reacted in a reaction medium in the presence of an added catalytic composition comprising (a) an organolithium initiator and (b) a catalyst compound having one of the formulas:

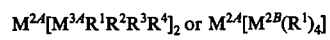

$$M^{2A}[M^{3A}R^1R^2R^3R^4]_2 \text{ or } M^{2A}[M^{2B}(R^1)_4]$$

in which $M^{2A}$ is a metal of Group 2A of the Mendeleev periodic table of elements; $M^{3A}$ is a metal of Group 3A of the Mendeleev periodic table of elements; $M^{2B}$ is a metal of Group 2B of the Mendeleev periodic table of elements; $R^1$, $R^2$ and $R^3$ are alkyl or aralkyl radicals; and $R^4$ is an alkyl radical or an aralkyl radical or the radical $OR^5$ in which $R^5$ is an alkyl radical or an aralkyl radical.

13 Claims, No Drawings

POLYMERIZATION PROCESS

The present invention relates to an improved process for the preparation of homopolymers of conjugated dienes or copolymers of conjugated dienes either with each other or with vinyl aromatic compounds, which polymers have a low content of 1,2 linkages and a high content of trans-1,4 linkages.

In my copending U.S. applications Ser. Nos. 582,120, 660,695 and 668,238, filed May 30, 1975, February 23, 1976 and March 18, 1976, respectively, the entire disclosures in each of which applications are hereby incorporated by reference herein, a process is described of homopolymerizing conjugated dienes or copolymerizing conjugated dienes either with other conjugated dienes or with vinyl aromatic compounds, for the preparation of homopolymers or copolymers which have simultaneously a high content of more than about 70% of trans-1,4 linkages and a low content of less than about 5% of 1,2 linkages, which comprises reacting the monomers in a reaction medium in the presence of an added anionic catalytic composition comprising (a) an organo-lithium initiator and (b) a cocatalyst system comprising a compound of barium or strontium and an organometallic compound of a metal of Groups 2B or 3A of the Mendeleev periodic table of elements.

It has now been found that the above described process can be improved by replacing the two components of the cocatalyst system with a single catalyst compound having, in each molecule, one atom of a metal of Group 2A per either one atom of a metal of Group 2B or two atoms of a metal of Group 3A, and having one of the following two formulas:

$$M^{2A}[M^{3A}R^1R^2R^3R^4]_2 \text{ or } M^{2A}[M^{2B}(R^1)_4]$$

in which $M^{2A}$ is a metal of Group 2A of the Mendeleev periodic table of elements, such as barium, calcium, strontium, or magnesium; $M^{3A}$ is a metal of Group 3A of the Mendeleev periodic table of elements, such as boron, aluminum, etc.; $M^{2B}$ is a metal of Group 2B of the Mendeleev periodic table of elements, such as zinc and cadmium; $R^1$, $R^2$ and $R^3$ are alkyl or aralkyl radicals; and $R^4$ is an alkyl radical or an aralkyl radical or the radical $OR^5$ in which $R^5$ is an alkyl radical or an aralkyl radical. Exemplary suitable alkyl and aralkyl radicals include ethyl, propyl, butyl, benzyl, xylyl and the like.

The present invention makes it possible to obtain the homopolymers or copolymers described in the above-mentioned patent applications within a shorter period of time by an increase of the homopolymerization or copolymerization velocity. It also makes it possible to carry out a less expensive process due to the decrease in the amount of organo-lithium initiator necessary. Furthermore, the present invention makes it possible to obtain homopolymers or copolymers of higher intrinsic viscosity, that is to say of higher molecular weight. The homopolymers and copolymers have an elastomeric character and therefore lend themselves to working in the production of articles of rubber, for instance, tires.

One advantageous embodiment of the present invention consists in using the catalyst compound and the organo-lithium initiator in the following molar ratios:

$$0.2 \leq \frac{\text{gram atoms of lithium}}{\text{gram atoms of metal of Group 2A}} \leq 4$$

and preferentially:

$$0.5 \leq \frac{\text{gram atoms of lithium}}{\text{gram atoms of metal of Group 2A}} \leq 2$$

The following nonlimitative examples are given by way of illustration of the advantages produced by the present invention.

EXAMPLE 1

Into a 250 cc. Steinie bottle filled with rectified nitrogen under pressure (about 1 bar) there were introduced, in succession, 61.5 g. of heptane, 9.225 g. of butadiene, 3.075 g. of styrene (namely 25% of the total weight of the monomers), 58 micromols of barium tetraethylaluminate, i.e., $Ba[Al(C_2H_5)_4]_2$, as the catalyst compound and 64 micromols of n-butyl lithium initiator, 6 micromols thereof serving to destroy the impurities of the heptane reaction medium.

The bottle was then placed in a thermostatically controlled tank maintained at 80° C. in which it was agitated. The polymerization was stopped when the conversion rate reached 80% (1½ hours). The polymerization was stopped by introducing 0.25 cc. of a 60 g./liter solution of methanol in toluene. The copolymer recovered had the following microstructure:

85% trans-1,4 linkage referred to the polybutadiene portion,

2% 1,2 linkage referred to the polybutadiene portion, and

15% styrene present in the copolymer (by weight).

The intrinsic viscosity (dl/g) of the copolymer was 1.6 (measured in toluene at 25° C.).

EXAMPLE 2

Butadiene and styrene were copolymerized under the same operating conditions as in Example 1, except that as the catalytic composition there was used: n-butyl lithium and $Ca[Al(C_2H_5)_4]_2$ The results are set forth in Table I below.

TABLE I

| | Micromols | | | Microstructure | | |
|---|---|---|---|---|---|---|
| Micromols of $Ca[Al(C_2H_5)_4]_2$ | of n-butyl lithium total | Time for 80% conversion | Intrinsic viscosity (dl/g) | % trans-1,4 | % 1,2 | % styrene incorporated |
| 86 | 63 | 2 hrs. | 0.81 | 77 | 6 | 10 |

EXAMPLE 3

The procedure of Example 1 was repeated, using as the catalytic composition: n-butyl lithium and $Sr[Al(C_2H_5)_4]_2$.

The results are set forth in Table II below.

TABLE II

| Micromols of Sr[Al(C₂H₅)₄]₂ | Micromols of n-butyl lithium total | Time for 80% conversion | Intrinsic viscosity (dl/g) | Microstructure | | |
|---|---|---|---|---|---|---|
| | | | | % trans-1,4 | % 1,2 | % styrene incorporated |
| 86 | 92 | 1 hr. | 1.1 | 80 | 6 | 13 |

EXAMPLE 4

Into a 250 cc. Steinie bottle filled with rectified nitrogen under pressure there were introduced 100 cc. of heptane and then 13.6 g. of butadiene. The catalyst compound

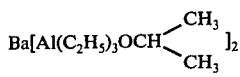

and the initiator, n-butyl lithium, were added one after the other.

The bottle was placed in a tank which was maintained thermostatically at 80° C., and in which it was agitated. The polymerization was stopped when the rate of conversion equaled 90%.

The results are set forth in Table III below:

TABLE III

| Micromols of Ba[Al(C₂H₅)₃OCH—(CH₃)₂]₂ | Micromols of n-butyl lithium total | Time for 90% conversion | Intrinsic viscosity (dl/g) | Microstructure | |
|---|---|---|---|---|---|
| | | | | % trans-1,4 | % 1,2 |
| 100 | 200 | 1 hr. | 1.35 | 76 | 4 |

Comparable results to those shown in the above tables are obtained when using a compound of the formula $M^{2A}[M^{2B}(R^1)_4]$ as the catalyst compound of the catalytic composition, such as CaZn(CH₃)₄, SrZn(C₂H₅)₄, BaZn(n-C₃H₇)₄, CaCd(C₂H₅)₄, SrCd(C₂H₅)₄, BaCd(n-C₄H₉)₄ and the like.

The homopolymers and copolymers obtained by this improved process have the properties necessary to constitute the main component of mixes intended to produce articles of rubber, particularly tires.

What is claimed is:

1. A process of homopolymerizing conjugated dienes or copolymerizing conjugated dienes with other conjugated dienes or with vinyl aromatic compounds to form elastomeric products having simultaneously a high content of more than about 70% of trans-1,4 linkages and a low content of less than about 5% of 1,2 linkages which comprises reacting the monomers in a reaction medium in the presence of an added catalytic composition comprising (a) an organo-lithium initiator and (b) a catalyst compound having the formula $$M^{2A}[M^{3A}R^1R^2R^3R^4]_2$$

in which $M^{2A}$ is a metal of Group 2A of the Mendeleev periodic table of elements; $M^{3A}$ is aluminum or boron; $R^1$, $R^2$ and $R^3$ are alkyl or aralkyl radicals; and $R^4$ is an alkyl radical or an aralkyl radical or the radical $OR^5$ in which $R^5$ is an alkyl radical or an aralkyl radical; said organo-lithium initiator and said catalyst compound being present in such amounts that the molar ratio of gram atoms of lithium to gram atoms of metal of Group 2A is between 0.2 and 4.

2. The process according to claim 1 wherein said molar ratio of gram atoms of lithium to gram atoms of metal of Group 2A is between 0.5 and 2.

3. The process according to claim 1 wherein the organo-lithium initiator used is n-butyl lithium, the conjugated diene used is butadiene and the vinyl aromatic compound used is styrene.

4. A process of homopolymerizing conjugated dienes or copolymerizing conjugated dienes with other conjugated dienes or with vinyl aromatic compounds to form elastomeric products having simultaneously a high content of more than about 70% of trans-1,4 linkages and a low content of less than about 5% of 1,2 linkages which comprises reacting the monomers in a reaction medium in the presence of an added catalytic composition comprising (a) an organo-lithium initiator and (b) a catalyst compound having the formula $$M^{2A}[M^{3A}R^1R^2R^3R^4]_2$$

in which $M^{2A}$ is a metal of Group 2A of the Mendeleev periodic table of elements; $M^{3A}$ is aluminum or boron; $R^1$, $R^2$, $R^3$ and $R^4$ are alkyl or aralkyl radicals; said organo-lithium initiator and said catalyst compound being present in such amounts that the molar ratio of gram atoms of lithium to gram atoms of metal of Group 2A is between 0.2 and 4.

5. The process according to claim 4 wherein said molar ratio of gram atoms of lithium to gram atoms of metal of Group 2A is between 0.5 and 2.

6. The process according to claim 4 wherein the organo-lithium initiator used is n-butyl lithium, the conjugated diene used is butadiene and the vinyl aromatic compound used is styrene.

7. The process according to claim 4 wherein the catalytic composition comprises n-butyl lithium and Ca[Al(C₂H₅)₄]₂.

8. The process according to claim 4 wherein the catalytic composition comprises n-butyl lithium and Ba[Al(C₂H₅)₄]₂.

9. The process according to claim 4 wherein the catalytic composition comprises n-butyl lithium and Sr[Al(C₂H₅)₄]₂.

10. A process of homopolymerizing conjugated dienes or copolymerizing conjugated dienes with other conjugated dienes or with vinyl aromatic compounds to form elastomeric products having simultaneously a high content of more than about 70% of trans-1,4 linkages of a low content of less than about 5% of 1,2 linkages which comprises reacting the monomers in a reaction medium in the presence of an added catalytic composition comprising (a) an organo-lithium initiator and (b) a catalyst compound having the formula $$M^{2A}[M^{3A}R^1R^2R^3R^4]_2$$

in which $M^{2A}$ is a metal of Group 2A of the Mendeleev periodic table of elements; $M^{3A}$ is aluminum or boron; $R^1$, $R^2$ and $R^3$ are alkyl or aralkyl radicals; and $R^4$ is the radical $OR^5$ in which $R^5$ is an alkyl radical or an aralkyl radical; said organo-lithium initiator and said catalyst compound being present in such amounts that the molar ratio of gram atoms of lithium to gram atoms of metal of Group 2A is between 0.2 and 4.

11. The process according to claim 10 wherein said molar ratio of gram atoms of lithium to gram atoms of metal of Group 2A is between 0.5 and 2.

12. The process according to claim 10 wherein the organo-lithium initiator used is n-butyl lithium, the conjugated diene used is butadiene and the vinyl aromatic compound used is styrene.

13. The process according to claim 10 wherein the catalytic composition comprises n-butyl lithium and $Ba[Al(C_2H_5)_3OCH(CH_3)_2]_2$.

* * * * *